United States Patent
Dickow (10) Patent No.: US 9,783,205 B2
(45) Date of Patent: Oct. 10, 2017

(54) SECURE LOW ENERGY VEHICLE INFORMATION MONITOR

(71) Applicant: Myine Electronics, Inc., Ferndale, MI (US)

(72) Inventor: Justin Dickow, Royal Oak, MI (US)

(73) Assignee: Livio, Inc., Royal Oak, MI (US)

( * ) Notice: Subject to any disclaimer, the term of this patent is extended or adjusted under 35 U.S.C. 154(b) by 194 days.

(21) Appl. No.: 14/789,114

(22) Filed: Jul. 1, 2015

(65) Prior Publication Data
US 2017/0001649 A1    Jan. 5, 2017

(51) Int. Cl.
*B60W 40/105*    (2012.01)
*B60W 50/14*    (2012.01)

(52) U.S. Cl.
CPC .......... *B60W 40/105* (2013.01); *B60W 50/14* (2013.01); *Y02B 60/50* (2013.01)

(58) Field of Classification Search
CPC ...... B60W 40/105; B60W 50/15; Y02B 60/50
See application file for complete search history.

(56) References Cited

U.S. PATENT DOCUMENTS

| | | | |
|---|---|---|---|
| 8,024,083 B2 | 9/2011 | Chenn | |
| 8,930,067 B1 * | 1/2015 | Green | G06Q 20/127 345/168 |
| 9,002,554 B2 * | 4/2015 | Chen | G06F 17/00 340/901 |
| 2011/0106333 A1 | 5/2011 | Scheider et al. | |
| 2012/0221188 A1 | 8/2012 | Kelly, III | |
| 2014/0273858 A1 | 9/2014 | Panther et al. | |
| 2015/0163210 A1 * | 6/2015 | Meyers | H04L 63/10 726/4 |

OTHER PUBLICATIONS

Anki Drive Programming Guide, last accessed Feb. 28, 2015, "Bluetooth LE Core Concepts" http://developer.anki.com/drive-sdk/docs/programming guide, (4 pages).
LitePoint, 2012, "Bluetooth Low Energy", (19 pages).
Fobo Tire, last accessed Feb. 28, 2015, "The World's First All Bluetooth Smart TPMS", https://my-fobo.com/Product/Fobotire, (6 pages).
Yoshida, Apr. 29, 2014, Embedded Systems Conference '15, "Is it Secure to Use BLE in Cars?" (4 pages).

* cited by examiner

*Primary Examiner* — Richard Camby
(74) *Attorney, Agent, or Firm* — Jennifer M. Stec; Brooks Kushman P.C.

(57) ABSTRACT

A computing platform of a vehicle may receive a request from a mobile device executing a data collection application using an element of vehicle data. The platform may access a permission table to confirm that a unique identifier of the mobile device is authorized to access the element of vehicle data. The mobile device may subscribe to a characteristic providing the element of vehicle data. The vehicle may update the element of vehicle data provided by the characteristic in accordance with a predefined threshold.

16 Claims, 8 Drawing Sheets

SECURE LOW ENERGY VEHICLE INFORMATION MONITOR

TECHNICAL FIELD

Aspects of the disclosure generally relate to monitoring of vehicle information by a mobile device using a low-energy communication protocol.

BACKGROUND

BLUETOOTH technology may be included in various user devices to allow the devices to communicate with one another. BLUETOOTH low energy (BLE) is another wireless technology designed to provide for communication of data between devices. As compared to BLUETOOTH, BLE offers communication of smaller amounts of data and with reduced power consumption.

BLE devices may perform the roles of central device or peripheral device. Central devices wirelessly scan for advertisements by peripheral devices, while peripheral devices make the advertisements. Once the peripheral device connects to the central device, the peripheral device may discontinue the advertisement, such that other central devices may no longer be able to wirelessly identify it or connect to it until the existing connection is broken.

BLE devices transfer data using concepts referred to as services and characteristics. Services are collections of characteristics. A central device may connect to and access one or more of the characteristics of a service of a peripheral device. Characteristics encapsulate a single value or data type having one or more bytes of data as well as zero or more descriptors that describe the value of the characteristic. The descriptors may include information such as human-readable descriptions, range for the value of the characteristic, or a unit of measure of the value of the characteristics. A Service Discovery Protocol (SDP) may allow a device to discover services offered by other devices and their associated parameters. The services may be identified by universally unique identifiers (UUIDs).

SUMMARY

In a first illustrative embodiment, a system includes a permission table indicating unique identifiers of mobile devices authorized to access elements of vehicle data; and a computing platform of a vehicle configured to access the permission table to identify whether a unique identifier of a requesting mobile device is authorized to access the vehicle data, and if so, allow the mobile device to subscribe to a characteristic wirelessly providing the element of vehicle data.

In a second illustrative embodiment, a system includes a mobile device having a wireless transceiver and a data collection application, configured to request an element of vehicle data from a vehicle using the wireless transceiver by providing a unique identifier of the mobile device and an indication of the data collection application to the vehicle; subscribe to a characteristic exposing the element of vehicle data when the request is granted; and receive the vehicle data from the characteristic.

In a third illustrative embodiment, a computer-implemented method includes receiving a request from a mobile device executing a data collection application requiring an element of vehicle data; accessing a permission table to confirm that a unique identifier of the mobile device is authorized to access the element of vehicle data; subscribing the mobile device to a characteristic providing the element of vehicle data; and updating the element of vehicle data provided by the characteristic in accordance with a predefined threshold.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

BLE may be utilized as a fast way for passive devices to advertise information to interested parties without a pairing process. Accordingly, BLE may be useful for in-vehicle purposes, such as for wirelessly sending vehicle data at relatively low intervals to mobile devices of vehicle occupants. However, in an environment in which many vehicles are located within close proximity, such as a parking structure or a traffic jam, there may be interference between vehicles where a user's mobile device may identify data advertisements from other vehicles. Moreover, in some cases the vehicle may require aftermarket accessories, such as on-board diagnostics (OBD) port dongles to facilitate controlled dissemination of vehicle information to mobile devices.

An improved system may allow the user to configure access to vehicle data exposed by characteristics of BLE modules in the vehicle. The system may provide a user interface to configure which elements of vehicle data should be advertised, and which thresholds should be used for notifications to subscribed devices. In some cases, the data may be advertised at intervals in accordance with the BLE specification. By using the thresholds to determine when to transmit updated data, the system may avoid issues with the limited amount of data that may be transmitted via BLE or other low energy protocols.

As an example, the vehicle may be configured to operate as a BLE peripheral to advertise information about vehicle speed to BLE centrals. The BLE centrals may include, for example, smartphones, tablets, or other mobile devices of the vehicle occupants. The vehicle may, for the subscribed BLE centrals, send out updates to the subscribed devices when the subscribed elements of vehicle data meet predefined thresholds. A data collection application may be installed to the mobile device which implements BLE APIs to read and subscribe to vehicle data characteristics. For instance, for a mobile device subscribed to a vehicle speed data element using the data collection application, the vehicle may provide an alert to the mobile device when the vehicle speed meets a predetermined threshold speed, such as beyond 100 kilometers per hour (KPH), or when the vehicle comes to a complete stop. The data collection application may receive the alert, and may display the alert to the user.

To provide for security of the vehicle data, the driver or other vehicle occupant may use the computing platform in the vehicle to configure a BLE characteristic to include a UUID unique to the mobile device of the occupant. The mobile device may use the UUID when subscribing to the services advertised by the vehicle. The vehicle may utilize the UUID to prevent access from an unauthorized UUID. The vehicle computer system may accordingly be configured to accept multiple authorized UUIDs so that multiple brought-in devices are authorized to read the data advertisements of the vehicle In one implementation, the vehicle computer system may be configured to read information about the vehicle from a vehicle network, such as a controller area network (CAN) bus or media oriented system transfer (MOST) ring, and send updates via BLE to subscribed devices in the vehicle. In another implementation, vehicle controller may expose vehicle data through characteristics provided by BLE modules of the vehicle controllers themselves. Further aspects of the system are described in detail below.

Figure 1:
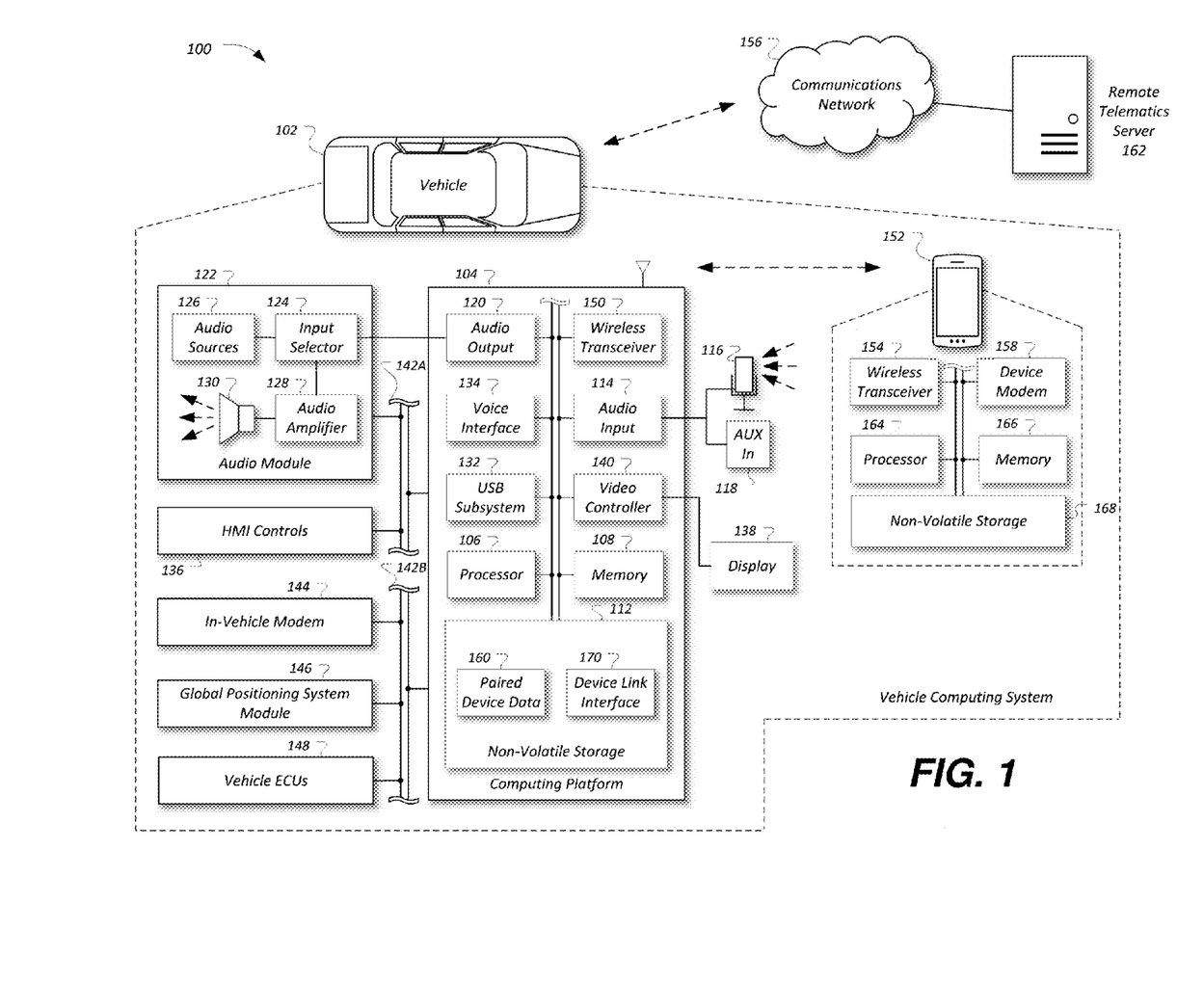
FIG. 1 illustrates an example diagram of a system configured to provide telematics services to a vehicle.

FIG. 1 illustrates an example diagram of a system 100 configured to provide telematics services to a vehicle 102. The vehicle 102 may include various types of passenger vehicle, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio module 122 having audio playback functionality. In other examples, the computing platform 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to grammar associated with available commands, and voice prompt generation for output via the audio module 122. In some cases, the system may be configured to temporarily mute or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 configured to provide current vehicle 102 location and heading information, and various vehicle ECUs 148 configured to corporate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142-A, and the vehicle modem 144, GPS module 146, and vehicle ECUs 148 may communicate with the computing platform 104 over a second in-vehicle network 142-B. In other examples, the computing platform 104 may be connected to more or fewer in-vehicle networks 142. Additionally or alternately, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. Additionally or alternately, the computing platform 104 may communicate with the mobile device 152 over a wired connection, such as via a USB connection between the mobile device 152 and the USB subsystem 132. In some examples the mobile device 152 may be battery powered, while in other cases the mobile device 152 may receive at least a portion of its power from the vehicle 102 via the wired connection.

The communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, such that the computing platform 104 may automatically reconnected to the mobile devices 152 referenced in the paired device data 160 without user intervention.

Similar to the computing platform 104, the mobile device 152 may include one or more processors 164 configured to execute instructions of mobile applications loaded to a memory 166 of the mobile device 152 from storage medium 168 of the mobile device 152. In some examples, the mobile applications may be configured to communicate with the computing platform 104 via the wireless transceiver 154 and with the remote telematics server 162 or other network services via the device modem 158. The computing platform 104 may also include a device link interface 170 to facilitate the integration of functionality of the mobile applications into the grammar of commands available via the voice interface 134. The device link interfaced 170 may also provide the mobile applications with access to vehicle information available to the computing platform 104 via the in-vehicle networks 142. An example of a device link interface 170 may be the SYNC APPLINK component of the SYNC system provided by The Ford Motor Company of Dearborn, Mich.

When the mobile device 152 is paired with the computing platform 104 (e.g., via a BLUETOOTH connection), the mobile device 152 may allow the computing platform 104 to use the network connectivity of the device modem 158. Thus may allow the computing platform 104 to communicate over the communications network 156 with the remote telematics server 162 or with other remote computing device. In one example, the computing platform 104 may utilize a data-over-voice plan or data plan of the mobile device 152 to communicate information between the computing platform 104 and the communications network 156. Additionally or alternately, the computing platform 104 may utilize the vehicle modem 144 to communicate information between the computing platform 104 and the communications network 156, without use of the communications facilities of the mobile device 152.

In some cases, the user of the mobile device 152 may desire for the mobile device 152 to communicate with other devices within the vehicle 102. For instance, it may be desirable in a data-sharing system for the mobile device 152 to communicate vehicle or other data from the vehicle 102 to mobile devices 152 within the vehicle 102, regardless of whether the devices are paired with the vehicle 102 as the mobile device 152 of the driver. To avoid affecting the BLUETOOTH pairing of a mobile device 152 to the computing platform 104, the mobile device 152 may be configured to communicate with the other devices using other protocols, such as BLE.

Figure 2A:
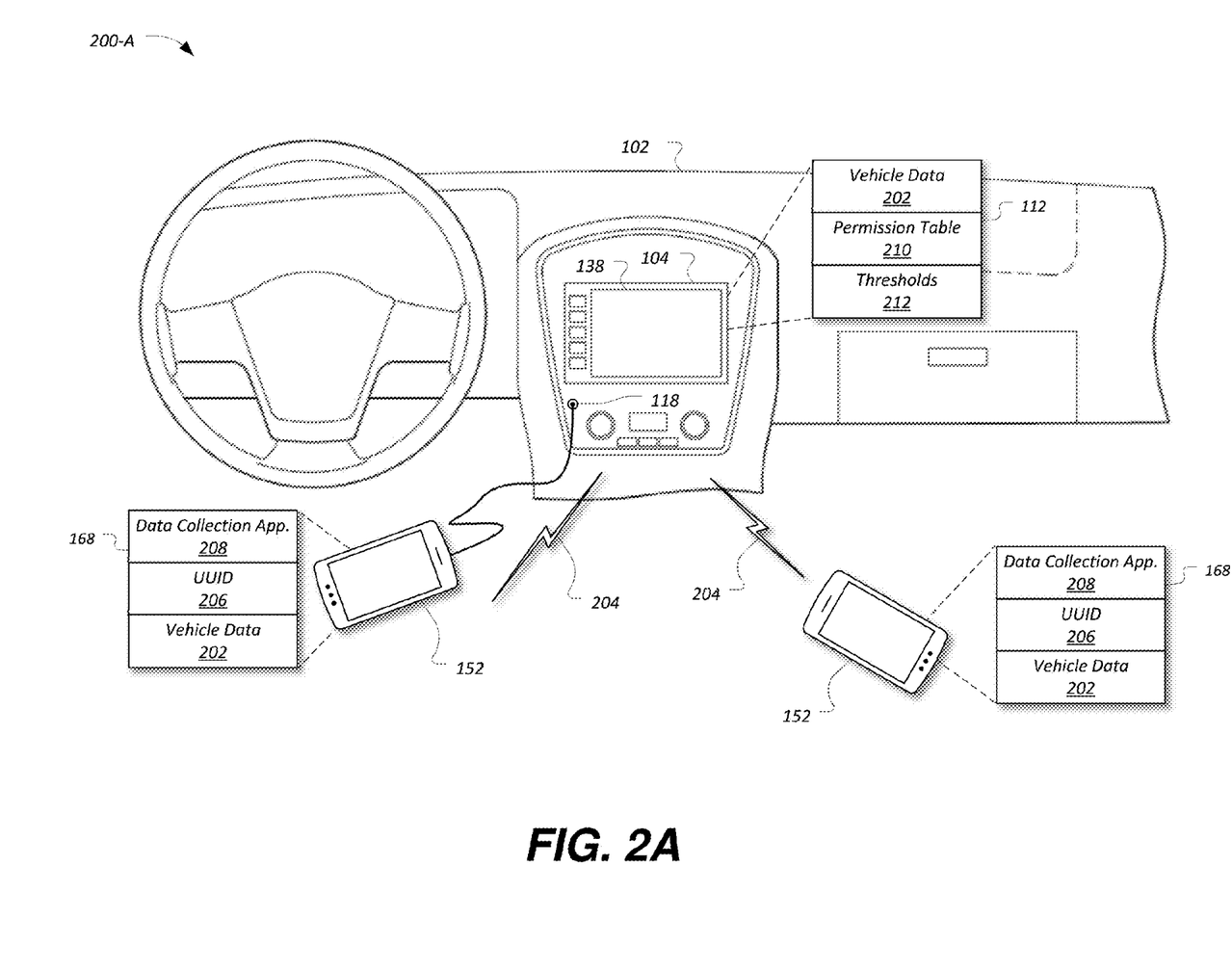
FIG. 2A illustrates an example portion of a vehicle configured for providing vehicle data to mobile devices via low energy network connectivity of the computing platform.

FIG. 2A is an illustrative example 200-A of a portion of a vehicle 102 configured for providing vehicle data 202 to mobile devices 152-A and 152-B (collectively mobile devices 152) via low energy network connectivity of the computing platform 104. As illustrated, the vehicle 102 includes a display 138 mounted in a relatively centralized control area between the driver and front passenger seats and controlled by the computing platform 104. The vehicle 102 further includes one or more mobile devices 152 connected to the vehicle 102 via data connections 204. One of the mobile devices 152 (i.e., mobile device 152-A as shown) may additionally be connected to the auxiliary audio input 118 to the computing platform 104, or may be paired with the computing platform 104 via BLUETOOTH as the mobile device 152 of the driver. It should be noted that this configuration is merely exemplary, and more or fewer mobile devices 152, as well as other vehicle 102 and computing platform 104 layouts may be utilized as well.

The vehicle data 202 may include, as some non-limiting examples, accelerator pedal position, steering wheel angle, vehicle speed, vehicle location (e.g., GPS coordinates, etc.), vehicle unique identifier (e.g., VIN), engine revolutions per minute (RPM), vehicle HMI information such as steering wheel button press information, door lock status, current transmission gear, miles traveled, oxygen sensor information, emissions information, instant fuel economy, average fuel economy, and battery state of charge, as some non-limiting examples.

The data connections 204 may include, for example, data connections 204 to the computing platform 104 to receive vehicle data 202 from various vehicle components, and/or data connections 204 to vehicle components themselves that expose wireless connectivity. In many examples discussed herein, these data connections 204 may be over BLE between the wireless transceiver 150 of the computing platforms 104 and mobile devices 152, as BLE may be utilized as a fast way for devices to advertise available vehicle data 202 to interested parties.

For instance, as shown in the example 200-A of FIG. 2A, the data connection 204-A may be established between the wireless transceiver 154 of the mobile device 152-A and the wireless transceiver 150 of the computing platform 104, and the data connection 204-B may be established between the wireless transceiver 154 of the mobile device 152-B and the wireless transceiver 150 of the computing platform 104. As another possibility, as shown in the example 200-B of FIG. 2B, the data connection 204-A may be established between the wireless transceiver 154 of the mobile device 152-A and a BLE transceiver 214-A of a vehicle ECU 148 of the vehicle 102, and the data connection 204-B may be established between the wireless transceiver 154 of the mobile device 152-B and the BLE transceiver 214-B of another vehicle ECU 148 of the vehicle 102.

Figure 2B:
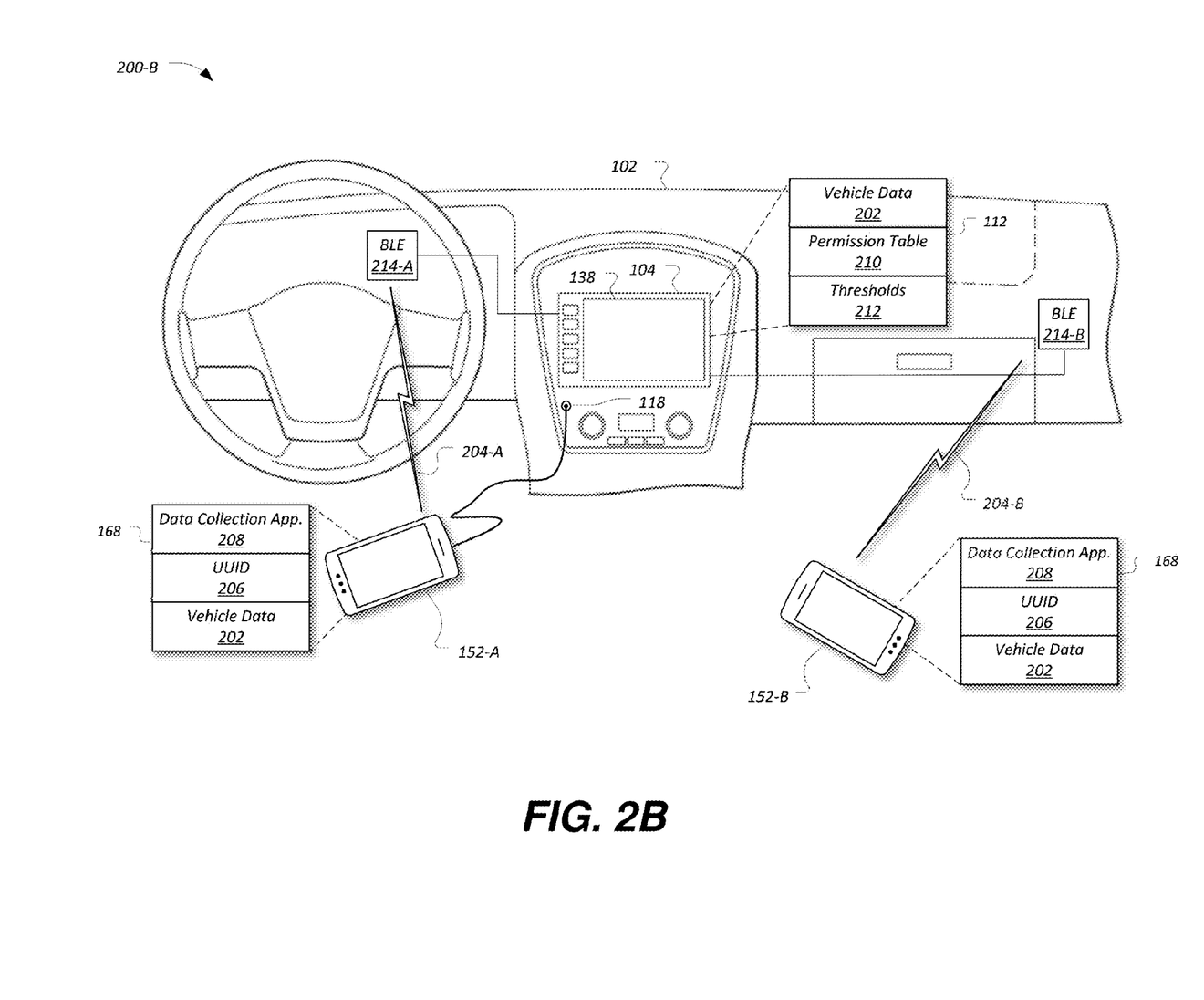
FIG. 2B illustrates an alternate example portion of a vehicle configured for providing vehicle data to mobile devices via low energy network connectivity of the computing platform.

In some implementations, the computing platform 104 may be configured to read information about the vehicle 102 from the vehicle buses 142, and send updates via BLE to subscribed mobile devices 152 in the vehicle 102 over the data connections 204. In other implementations, vehicle ECUs 148 or other vehicle modules within the vehicle 102 that might have interesting characteristics may utilize BLE transceivers 214 separate from but configured by the computing platform 104 to send updates via BLE to the subscribed mobile devices 152 in the vehicle 102. It should be noted, however, that the examples 200-A and 200-B illustrated in FIGS. 2A and 2B are merely two possibilities, and other wireless data protocols or module implementations may be utilized supporting data connections 204 to the mobile devices 152.

The data connections 204 may be useful for in-vehicle purposes, such as for wirelessly sending vehicle data 202 at relatively low intervals to interested mobile devices 152 in the vehicle 102. However, in an environment in which many vehicles 102 are located within close proximity, such as a parking structure or a traffic jam, there may be interference between vehicles 102 where a user's mobile device 152 may identify data advertisements from other vehicles 102.

The UUID 206 may include a numeric or other identifier that may be used to distinguish the mobile devices 152 by the vehicle 102. In an example, the UUID 206 may be a large binary value, such as a 64-bit binary value or a 128-bit binary value. In another example, the UUID 206 may be an identifier of the mobile device 152 utilized for communications over the communications network 156, such as a MDN or subscriber identity module (SIM) information of the modem device modem 158, such as international mobile station equipment identity (IMEI) information. Regardless of the specific UUID 206 implementation, the mobile device 152-A may be assigned to a first UUID 206, and the second mobile device 152-B may be assigned to a second UUID 206, different from the first UUID 206.

The data collection application 208 may be an example of a mobile application installed to the mobile device 152. The data collection application 208 may be configured to receive input (e.g., user input to a user interface of the mobile device 152), and communicate with the vehicle 102 via the computing platform 104, as discussed in greater detail below. In particular, the data collection application 208 may be used by users to receive vehicle data 202 of the vehicle 102.

The data collection application 208 may undergo a process when the mobile device 152 is connected to the computing platform 104, in which the computing platform 104 receives a request from the mobile device 152, and the user confirms the UUID 206 of the mobile device 152 to access the vehicle data 202 of the computing platform 104. The data collection application 208 may generate the UUID 206, e.g., upon startup, and may persistently store the generated UUID 206 for continued communication with the vehicle 102. The computing platform 104 may maintain a permission table 210 indicating UUIDs 206 or other information regarding mobile devices 152 authorized to have permission to access elements of vehicle data 202 from the computing platform 104. In some examples, for each listed UUID 206, the permission table 210 may further include information descriptive of which elements of vehicle data 202 are to be made available to the mobile device 152. Accordingly, when the mobile device 152 is identified via the computing platform 104 as being associated with a UUID 206 included within the permission table 210, the computing platform 104 may utilize the permission table 210 to automatically allow the data collection application 208 to reconnect to computing platform 104 to receive the vehicle data 202 to which the mobile device 152 is authorized.

The thresholds 212 may include information descriptive of when the computing platform 104 should determine to update the vehicle data 202 for notifications to the subscribed mobile devices 152. By using the thresholds 212 to determine when to transmit, notify, or otherwise make available updated vehicle data 202, the system 100 may avoid issues with the limited amount of data that may be transmitted via BLE or other low energy protocols. In an example, the thresholds 212 may indicate a threshold update frequency or timeout indicative of when updated vehicle data 202 should be indicated to subscribed centrals (e.g., every second, every five seconds, every minute, every ten data reads of the vehicle data 202, every hundredth value of the vehicle data 202, etc.). In another example, the thresholds 212 may additionally or alternately indicate data values above or below which updated vehicle data 202 should be indicated to subscribed centrals (e.g., a minimum threshold value of the vehicle data 202, a maximum threshold value of the vehicle data 202, a threshold difference from a previous value of the vehicle data 202, etc.)

In some cases, the permission table 210 and thresholds 212 may be utilized by the computing platform 104 to determine when vehicle data 202 exposed by characteristics of the computing platform 104 should be updated and to what mobile devices 152. In other cases, the permission table 210 and thresholds 212 may be provided by the computing platform 104 to the vehicle ECUs 148, so that the vehicle ECUs 148 may configure the BLE transceivers 214 to expose the vehicle data 202 in characteristics in accordance with the thresholds 212 and to the appropriate mobile device 152.

Figure 3A:
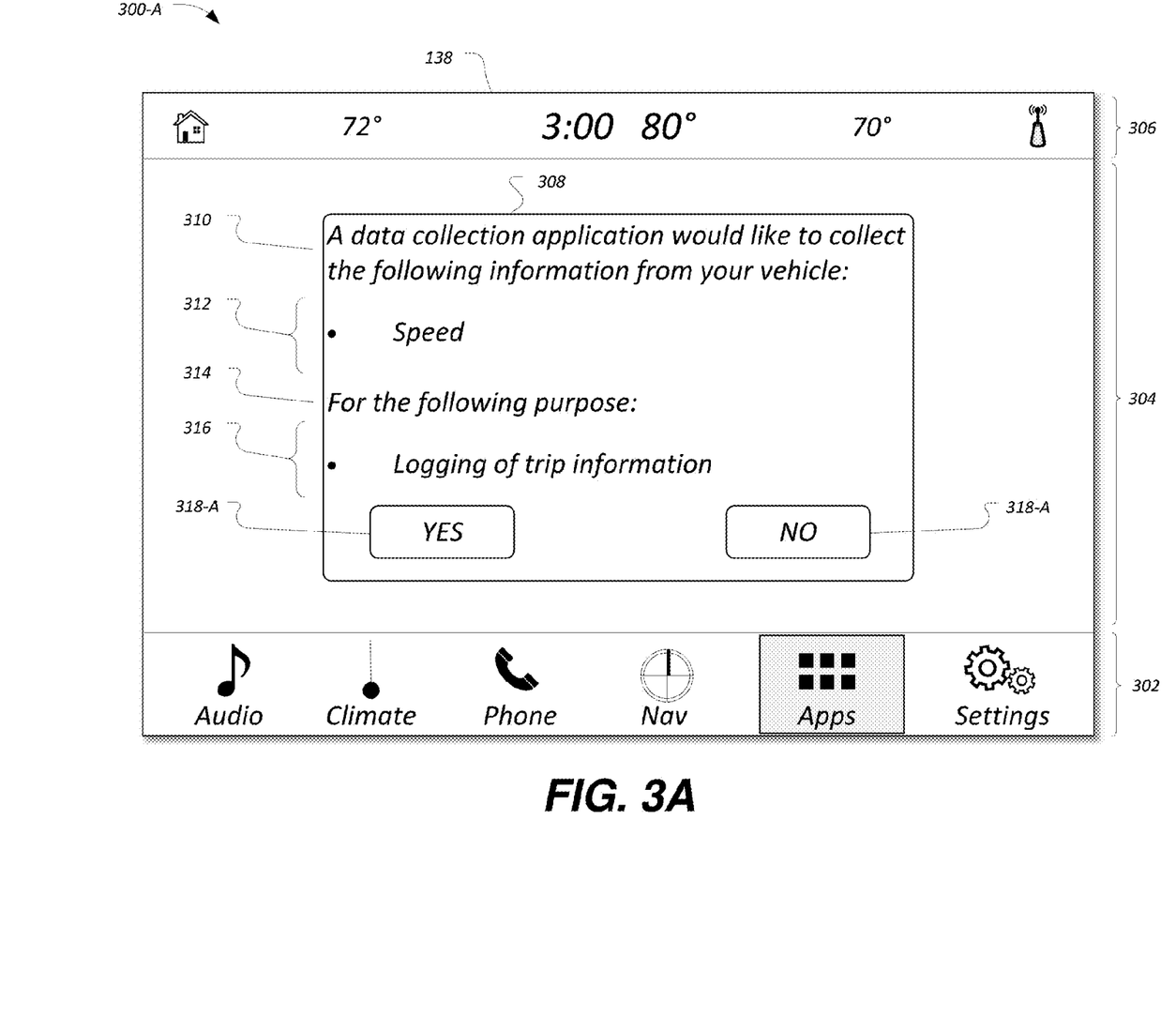
FIG. 3A illustrates an example user interface of the computing platform for requesting authorization for the mobile device to receive vehicle data.

FIG. 3A illustrates an example user interface 300-A of the computing platform 104 for requesting authorization for the mobile device 152 to receive vehicle data 202. In an example, the user interface 300 may be displayed on a head unit or other display 138 of the vehicle 102. The head unit display 138 may be driven, for example, by the video connection of the video controller 140 to the computing platform 104 of the vehicle 102. The user interface 300 may allow the user to configure characteristics of the sharing of vehicle data 202 to the mobile devices 152 over the data connections 204 (e.g., connections 204 to the wireless transceiver 150 of the computing platform 104, connections 204 to BLE transceivers 214 in the vehicle 102 providing vehicle data 202, etc.). The user may utilize the user interface 300 to configure which elements of vehicle data 202 should be advertised.

As shown, the user interface 300 includes a category listing 302 of one or more screen of content to be displayed in the main screen area 304 of the head unit display 138. As some examples, the category listing 302 may include an audio screen from which configuration of vehicle 102 audio settings may be performed, a climate control screen from which vehicle 102 climate control settings may be configured, a phone screen from which calling services may be utilized, a navigation screen from which maps and routing may be performed, an applications screen from which installed applications may be invoked, and a settings screen from which backlighting or other general settings of the head unit display 138 may be accessed. The user interface 300 may also include a general information area 306 from which time, current temperature, and other information may remain visible to the user, regardless of the specific screen or application that is active in the main screen area 304.

When a user enters the vehicle 102 carrying a mobile device 152 to the data collection application 208 is installed, the mobile device 152 and the computing platform 104 may attempt to connect to share vehicle data 202. To use BLE data connections 204 in an example, the data collection application 208 may utilize the wireless transceiver 154 of the mobile device 152 to search for and write to a characteristic of the vehicle 102 indicating interest in collection of the vehicle data 202.

If a UUID 206 of a mobile device 152 not included in the permission table 210 is identified, the computing platform 104 may initiate a permission request 308 with the user. In an example, the permission request 308 may be provided in the display 138 as shown in the user interface 300. The permission request 308 may include a description label 310 indicating that the data collection application 208 requests vehicle data 202 from the vehicle 102. In some cases, the description label 310 may indicate a name or other identifier of the data collection application 208 requesting access (e.g., "Trip Monitor", etc.), while in other cases, the description label 310 may generally indicate that a data collection application 208 is requesting access. The permission request 308 may further include data indications 312 of the vehicle data 202 being requested by the data collection application 208 (e.g., speed information as shown), as well as a purpose label 314 including purpose indications 316 descriptive of the reason for the data collection application 208 to request access to the indicated vehicle data 202.

The information to include in the data indications 312 and the purpose indications 316 may be determined by the computing platforms 104 according to the request for vehicle data 202. In an example, the data collection application 208 may specify the requested vehicle data 202 in the request provided to the computing platform 104. In another example, the computing platform 104 may determine the requested vehicle data 202 according to the identifier or name of the data collection application 208.

The permission request 308 may further include selection controls 318 that may be used by the user to determine whether or not to allow the data collection application 208 access to the vehicle data 202. In an example, the selection controls 318 may include a yes selection control 318-A that, when selected by the user, allows the data collection application 208 access to the specified vehicle data 202, and a no selection control 318-B that, when selected by the user, denies the data collection application 208 access to the specified vehicle data 202. Thus, when the data collection application 208 subscribes, the peripheral receives a subscription permission requests 308, propagates the subscription permission requests 308 to the user after a check of the permission table 210, and responds success or fail to the subscription permission requests 308.

It should be noted that the illustrated permission request 308 is only an example, and permission requests 308 having, more, fewer, or different information or controls may be utilized. For instance, an alternate permission request 308 may facilitate access to all vehicle data 202 for the data collection application 208, regardless of the specific elements of vehicle data 202 that may be required. In some examples, the permission request 308 may additionally or alternately be provided in other manners, such as by way of a voice prompt interaction with the user.

In some examples, the thresholds 212 may be predefined by the computing platform 104 or based on reporting requirements of the data collection application 208. In other examples, the thresholds 212 may be configurable by the user.

Figure 3B:
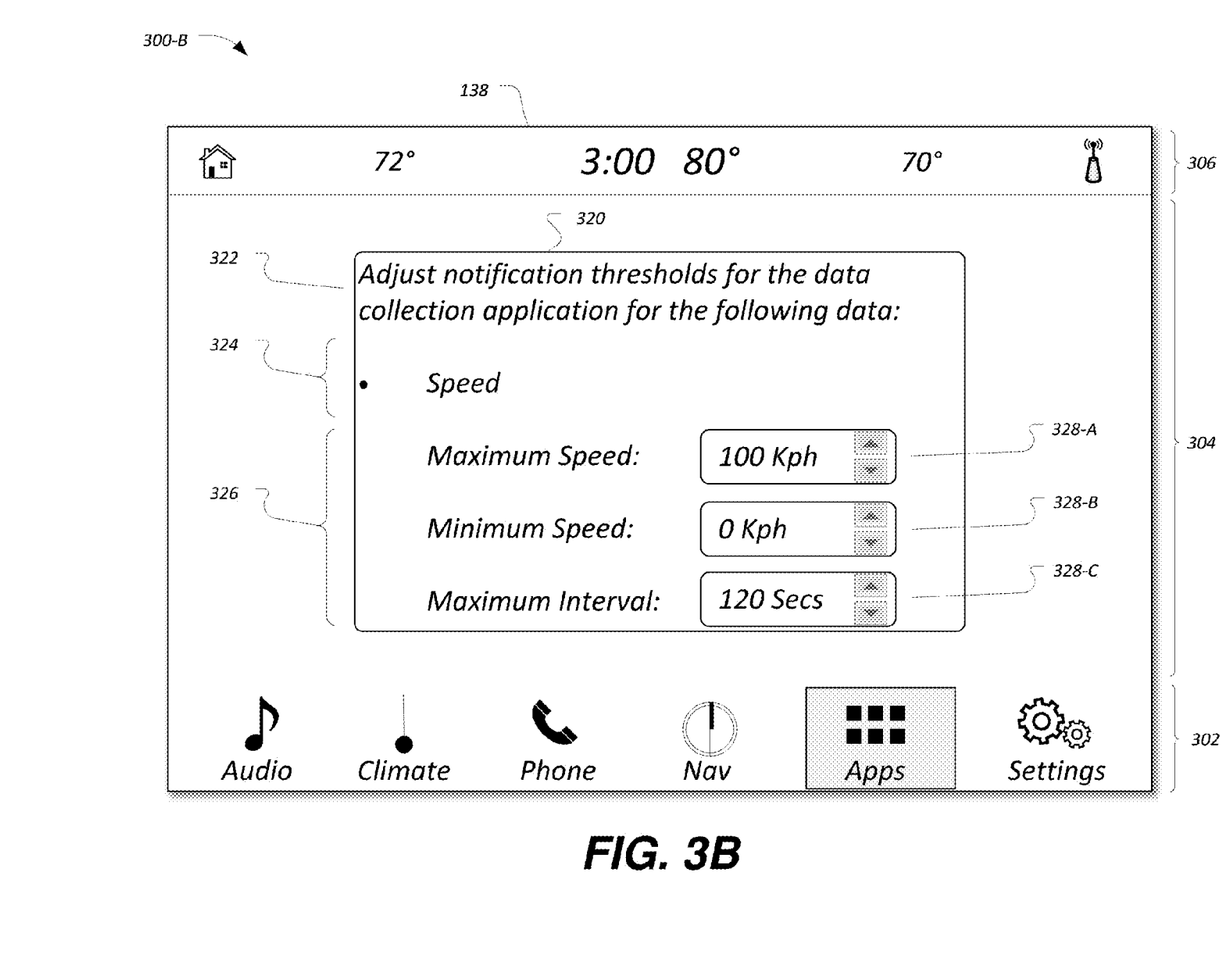
FIG. 3B illustrates an example user interface of the computing platform for configuration of thresholds for updating the vehicle data.

FIG. 3B illustrates an example user interface 300-B of the computing platform 104 for configuration of thresholds 212 for updating the vehicle data 202. In an example, similar to the user interface 300-A the user interface 300-B may be displayed on a head unit or other display 138 of the vehicle 102. In other examples, the user interface 300-B may be displayed by the mobile device 152 executing the data collection application 208. The user interface 300-B may allow the user to configure thresholds 212 used to update the exposed vehicle data 202 shared to the mobile devices 152 over the data connections 204. In some examples, the user interface 300-B may be displayed automatically responsive to user selection of the yes selection control 318-A from the user interface 300-A. In other examples, the user interface 300-B may be displayed responsive to user selection of a threshold 212 configuration option.

Regardless of how the user interface 300-B is invoked or on what device is it displayed, the user interface 300-B may include a threshold configuration request 320. In an example, the threshold configuration request 320 may include a description label 322 indicating that the threshold configuration request 320 is for configuration of the threshold 212 settings of the data collection application 208. The threshold configuration request 320 may further include a data indication 324 of the element of vehicle data 202 for which thresholds 212 are being configured (e.g., continuing with the speed information example, as shown).

The user interface 300-B may additional include one or more threshold configuration controls 326 from which the thresholds 212 of the element of vehicle data 202 may be adjusted. To continue with the speed vehicle data 202 example, the user interface 300-B may include a maximum speed configuration control 328-A from which the user can select a maximum speed that would cause the vehicle data 202 to be updated, a minimum speed configuration control 328-B from which the user can select a minimum speed that would cause the vehicle data 202 to be updated, and a speed configuration control 328-C from which the user can select a maximum time interval between vehicle data 202 updates.

Thus, the examples vehicle 102 may be configured to operate as a BLE peripheral to advertise vehicle data 202 about vehicle speed to mobile devices 152 operating as BLE centrals. The vehicle 102 may, for the subscribed BLE centrals, send out updates when the subscribed elements of vehicle data 202 meet predefined threshold 212 values. The data collection applications 208 installed to the mobile device 152 may utilize BLE APIs to read and subscribe to vehicle data 202 characteristics for which the mobile devices 152 are given permission. For instance, for a mobile device 152 subscribed to a vehicle speed element of vehicle data 202, the vehicle 102 may provide an alert to the mobile device 152 when the vehicle speed meets a predetermined speed threshold 212, such as beyond 100 kilometers per hour (KPH), or when the vehicle 102 comes to a complete stop. The data collection application 208 may receive the alert, and may display the alert to the user.

Figure 4:
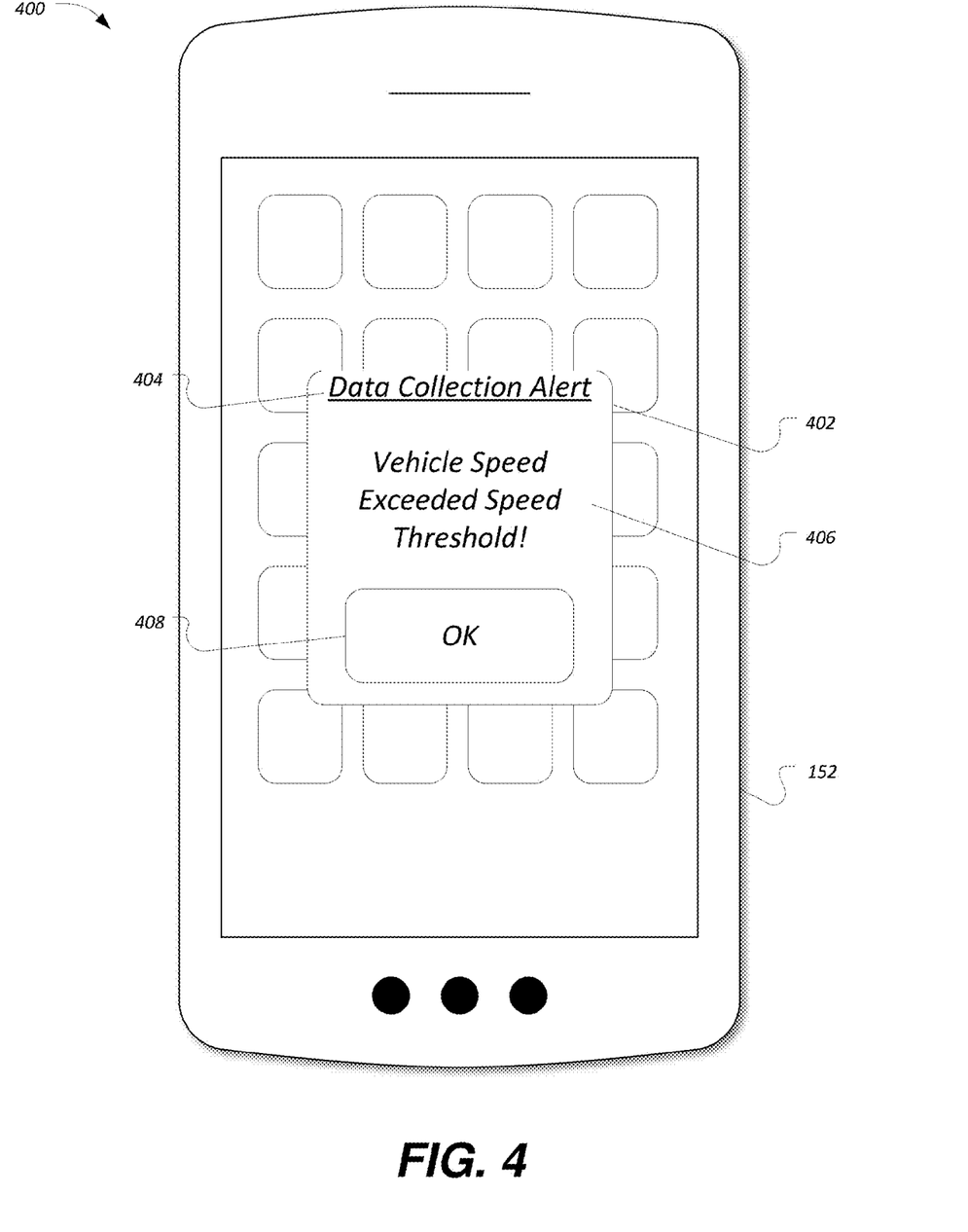
FIG. 4 illustrates an example user interface of the mobile device displaying an alert based on vehicle data received from the vehicle.

FIG. 4 illustrates an example user interface 400 of the mobile device 152 displaying an alert 402 based on vehicle data 202 received from the vehicle 102. The alert 402 may be displayed by the data collection application 208 to a display of the mobile device 152, for example, responsive to receipt of a vehicle data 202 by the mobile device 152 sent from the vehicle 102. The vehicle data 202 may have been sent to the mobile device 152 from the vehicle 102 based on a determination by the vehicle 102 of the vehicle data 202 meeting one or more specified thresholds 212 of the computing platform 104. For instance, the computing platform 104 may compare vehicle data 202 received over the vehicle buses 142 to thresholds 212 maintained by the computing platform 104. As another possibility, vehicle ECUs 148 or other vehicle modules within the vehicle 102 that might have interesting characteristics may utilize BLE transceivers 214 as configured by the thresholds 212 and other settings of the computing platform 104 to send updates via BLE to the subscribed mobile devices 152 in the vehicle 102.

As shown, the alert 402 may include a title label 404 to indicate to the user that the alert 402 is generated based on vehicle data 202 received from the data collection application 208. The alert 402 may further include a description label 406 describing the vehicle data 202 and threshold 212 that was hit. The alert 402 may also include a button 408 that, when selected by the user, is configured to cause the data collection application 208 to dismiss the alert. In other example alerts 402, the alert 402 may be integrated by the mobile device 152 or data collection application 208 into a user interface of compiled alerts, such as in a general alert listing including information such as received text messages, missed calls, and/or weather changes, as some examples.

Figure 5:
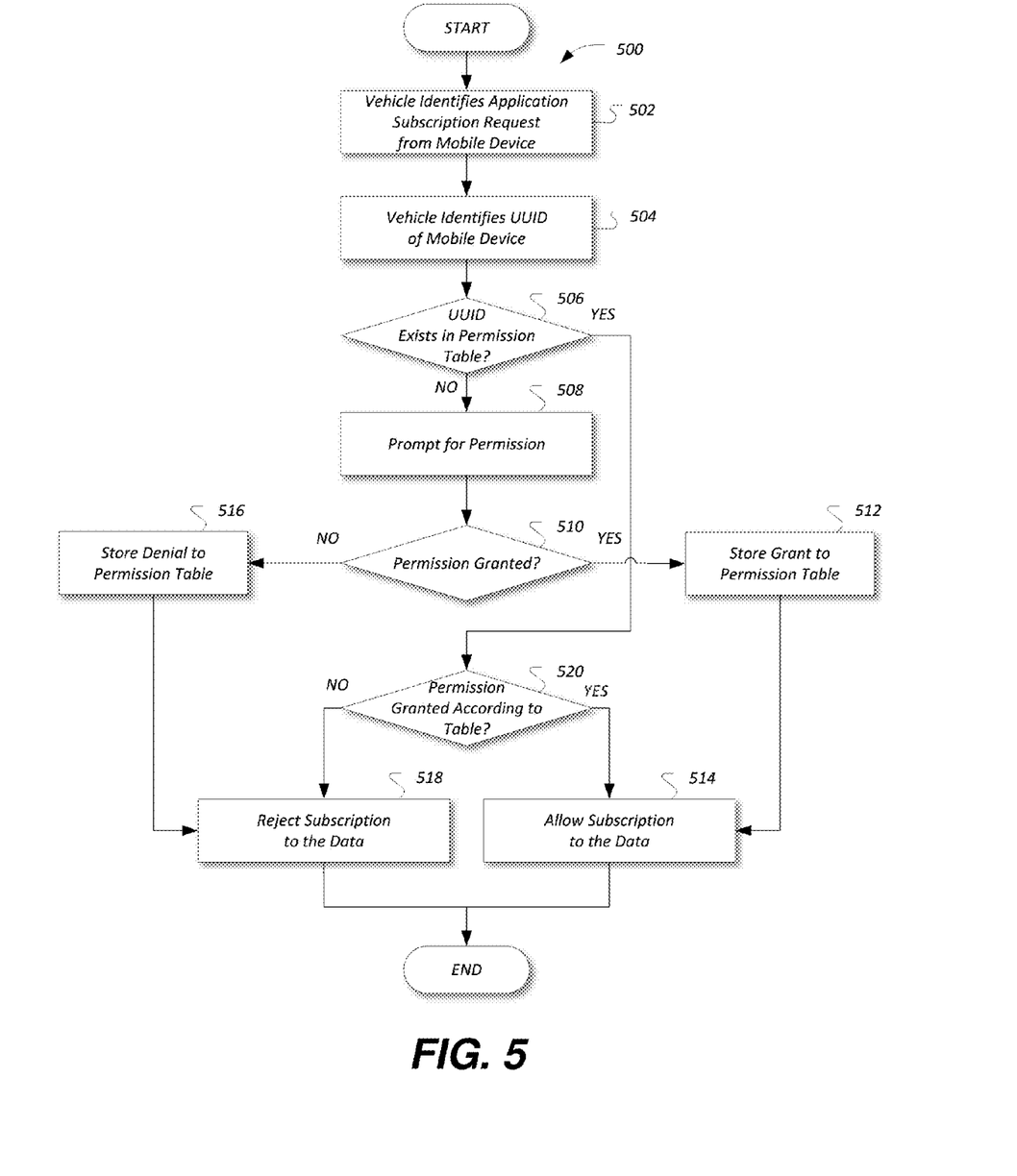
FIG. 5 illustrates an example process for authorizing the data collection application to receive vehicle data from the vehicle.

FIG. 5 illustrates an example process 500 for authorizing the data collection application 208 to receive vehicle data 202 from the vehicle 102. The process 500 may be performed, in an example, by the computing platform 104 of the vehicle 102 in communication with the mobile device 152.

At operation 502, the vehicle 102 detects connection of a mobile device 152. In an example, the data collection application 208 may utilize the wireless transceiver 154 of the mobile device 152 to search for and write to a characteristic of the vehicle 102 indicating interest in collection of the vehicle data 202. The information provided to the computing platform 104 may include, for example, one or more of the UUID 206 of the mobile device 152, a name or other identifier of the data collection application 208, and indications of one or more elements of vehicle data 202 to which the mobile device 152 requests to subscribe.

At operation 504, the vehicle 102 identifies a UUID 206 of the mobile device 152. In an example, the computing platform 104 may receive the UUID 206 of the mobile device 152 written to a characteristic of the computing platform 104. In another example, the computing platform 104 may read the UUID 206 from a characteristic exposed by the mobile device 152.

At operation 506, the vehicle 102 determines whether the UUID 206 exists in the permission table 210. In an example, the computing platform 104 may maintain a permission table 210 indicating UUIDs 206 or other information regarding mobile devices 152 that have been previously been authorized to have permission to access elements of vehicle data 202 from the computing platform 104. The computing platform 104 may further access the permission table 210 to determine whether the UUID 206 is included within the permission table 210. If so, control passes to operation 520. Otherwise, control passes to operation 508.

At operation 508, the vehicle 102 prompts the user to provide permission to the mobile device 152. In an example, computing platform 104 may present a user interface (such as the user interface 300-A described above) to receive confirmation or rejection of the connection of the mobile device 152 to the computing platform 104 for retrieval of vehicle data 202. The user interface 300 may further include information descriptive of the particular vehicle data 202 being requested by the mobile device 152 and/or a purpose for the collection of the vehicle data 202.

At operation 510, the vehicle 102 determines whether permission is granted. In an example, the computing platform 104 may determine whether the user interface 300-A has received confirmation (e.g., via the yes selection control 318), or rejection (e.g., via the no selection control 318-B). If permission is granted, control passes to operation 512. Otherwise, control passes to operation 516.

At operation 512, the vehicle 102 stores the permission grant to the permission table 210. In an example, the computing platform 104 may add the UUID 206 of the mobile device 152 to the permission table 210 as an allowed mobile device 152. In another example, the computing platform 104 may further add association of the specific vehicle data 202 being requested to the permission table 210, rather than allowing permission for any vehicle data 202 to be provided to the mobile device 152.

At operation 514, the vehicle 102 allows the mobile device 152 subscription to the vehicle data 202. In an example, the computing platform 104 may allow the subscription of the mobile device 152 to characteristics providing the requested vehicle data 202. In some examples, the computing platform 104 may further provide the mobile device 152 with UUIDs or other information specifying which characteristics made available by the computing platform 104 and/or the BLE transceivers 214 provide the requested vehicle data 202. After operation 514, the process 500 ends.

At operation 516, the vehicle 102 stores the permission denial to the permission table 210. In an example, the computing platform 104 may add the UUID 206 of the mobile device 152 to the permission table 210 as a rejected mobile device 152. In another example, the computing platform 104 may further add association of the specific vehicle data 202 being requested to the permission table 210, to indicate that those specific elements of rejected vehicle data 202 are denied, rather than overall denying permission for any vehicle data 202 to be provided to the mobile device 152.

At operation 518, the vehicle 102 denies the mobile device 152 subscription to the vehicle data 202. In an example, the computing platform 104 may deny the subscription of the mobile device 152 to the requested vehicle data 202. After operation 518, the process 500 ends.

At operation 520, the vehicle 102 determines, according to the permission table 210, whether permission is granted. In an example, the computing platform 104 may access the permission table 210 to determine whether the UUID 206 is allowed to subscribe to receive the requested vehicle data 202. If so, control passes to operation 514. Otherwise, control passes to operation 518.

Variations on the process 500 are possible. In an example, if permission is denied according to the permission table 210, the operation 520 may transition to operation 508 to prompt for permission rather than transitioning to operation 518 to reject the subscription. In another example, the prompt for permission may further include configuration of thresholds 212, an example of which is described above with respect to the user interface 300-B.

Figure 6:
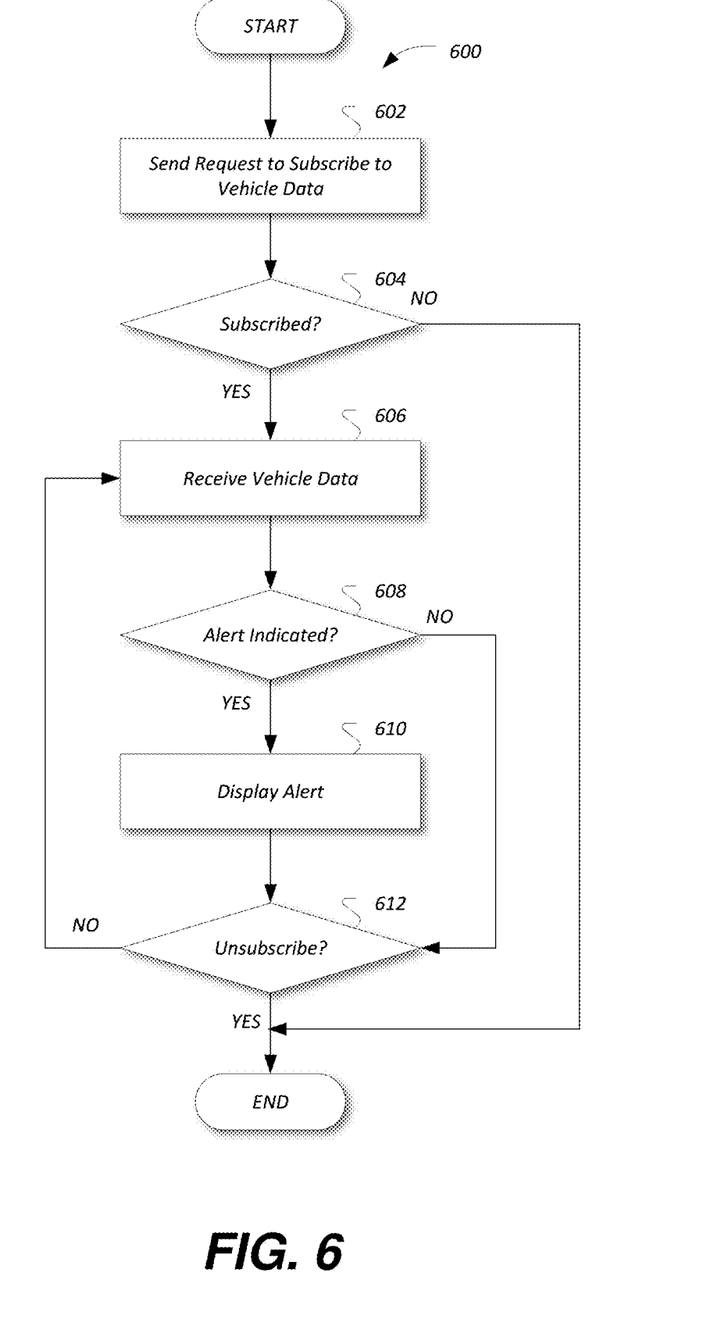
FIG. 6 illustrates an example process for authorizing the data collection application to receive vehicle data from the vehicle.

FIG. 6 illustrates an example process 600 for authorizing the data collection application 208 to receive vehicle data 202 from the vehicle 102. The process 600 may be performed, in an example, by the mobile device 152 in communication with the computing platform 104 via a data connection 204.

At operation 602, the mobile device 152 sends a request to subscribe to vehicle data 202. In an example, the mobile device 152 may respond to BLE scanning for characteristics identifying the data collection application 208 of the mobile device 152 performed by the computing platform 104 of the vehicle 102. In another example, the data collection application 208 may utilize the wireless transceiver 154 of the mobile device 152 to search for and write to a characteristic of the vehicle 102 indicating interest in collection of the vehicle data 202. The information provided to the computing platform 104 may include, for example, one or more of the UUID 206 of the mobile device 152, a name or other identifier of the data collection application 208, and indications of one or more elements of vehicle data 202 to which the mobile device 152 requests to subscribe.

At operation 604, the mobile device 152 determines whether the subscription to the vehicle data 202 was successful. In an example, the mobile device 152 may receive information from the computing platform 104 indicated regarding whether or not the subscription is permitted, e.g., based on prompting the user or lookup in the permission table 210 of whether the UUID 206 of the mobile device 152 is allowed to subscribe to receive the requested vehicle data 202. Further aspects of the determination are discussed in detail above with respect to the process 500. If the mobile device 152 is subscribed, control passes to operation 606. Otherwise the process 600 ends.

At operation 606, the mobile device 152 receives vehicle data 202. In an example, the mobile device 152 may query, receive, or be notified of updated vehicle data 202 to the subscribed characteristics. In an example, the data updated to the characteristics may be performed by the vehicle 102 according to thresholds 212 that indicate a threshold update frequency or timeout indicative of when updated vehicle data 202 should be advertised (e.g., every second, every five seconds, every minute, every ten data reads of the vehicle data 202, every hundredth value of the vehicle data 202, etc.). In another example, the thresholds 212 may additionally or alternately indicate data values above or below which updated vehicle data 202 should be advertised (e.g., a minimum threshold value of the vehicle data 202, a maximum threshold value of the vehicle data 202, a threshold difference from a previous value of the vehicle data 202, etc.) Accordingly, by using the thresholds 212, the mobile device 152 may be able to receive the desired vehicle data 202 while avoiding issues with the limited amount of data that may be transmitted via BLE or other low energy protocols.

At operation 608, the mobile device 152 determines whether an alert 402 is indicated. In an example, the mobile device 152 may be subscribed to a vehicle speed element of vehicle data 202, such that the mobile device 152 will provide an alert when the vehicle speed meets a predetermined speed threshold 212, such as beyond 100 kilometers per hour (KPH), or when the vehicle 102 comes to a complete stop. If the alert 402 is indicated, control passes to operation 610. Otherwise, control passes to operation 612.

At operation 610, the mobile device 152 displays the alert 402. An example user interface 400 of the mobile device 152 displaying an alert 402 is discussed in detail above with respect to FIG. 4. After operation 610, control passes to operation 612.

At operation 612, the mobile device 152 determines whether to unsubscribe to the vehicle data 202. In an example, the mobile device 152 may receive user input that the user no longer wishes to receive the vehicle data 202 (e.g., stop logging). In another example, the vehicle 102 may be turned off, and may no longer provide the vehicle data 202. If the mobile device 152 is to unsubscribe to the vehicle data 202, the process 600 ends. Otherwise, if the subscription is maintained, control passes to operation 606 to receive additional vehicle data 202.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a permission table indicating unique identifiers of mobile devices authorized to access specified elements of vehicle data; and
a computing platform of a vehicle configured to
access the permission table to identify whether a unique identifier of a requesting mobile device is authorized to access the vehicle data,
if so, allow the mobile device to subscribe over a wireless data connection to a characteristic providing the element of vehicle data, and
when the permission table lacks an entry for the unique identifier, provide a prompt in a display of the vehicle to identify whether the unique identifier is authorized to access the vehicle data.

2. The system of claim 1, wherein the computing platform is further configured to update the permission table responsive to receipt of user input to the display of the vehicle identifying whether the unique identifier is authorized to access the vehicle data.

3. The system of claim 1, wherein the vehicle data is exposed wirelessly from the computing platform over BLUETOOTH Low Energy (BLE).

4. The system of claim 1, wherein the computing platform is further configured to:
utilize a wireless transceiver to perform wireless scanning for characteristics identifying a data collection application of the mobile device; and
identify the requesting mobile device as exposing a characteristic specifying the unique identifier of the mobile device and the elements of vehicle data.

5. The system of claim 4, wherein the computing platform identifies the elements of vehicle data based on an identity of the data collection application.

6. The system of claim 1, wherein the computing platform is further configured to:
expose a characteristic to which the requesting mobile device writes the unique identifier; and
identify the requesting mobile device responsive to the mobile device writing to the characteristic.

7. The system of claim 1, wherein the computing platform is further configured to update the element of vehicle data provided by the characteristic in accordance with a threshold specifying update criteria including one or more of: (i) a threshold update frequency, (ii) a data value above or below which updated vehicle data is advertised, and (iii) a threshold difference from a previous value of the vehicle data above or below which updated vehicle data is advertised.

8. The system of claim 1, wherein the computing platform is further configured to:
read information indicative of the element of vehicle data from one or more vehicle buses to which the computing platform and vehicle electronic control units (ECUs) are communicatively connected; and
send updates to the mobile device over the data connection.

9. The system of claim 1, wherein the computing platform is further configured to direct over a vehicle bus to which the computing platform and a plurality of vehicle electronic control units (ECUs) are communicatively connected, one of the ECUs to utilize a wireless transceiver connected to the ECU to send updated including the element of vehicle data to the mobile device.

10. A system comprising:
a mobile device having a wireless transceiver and a data collection application, configured to
request an element of vehicle data from a vehicle using the wireless transceiver by providing a unique identifier of the mobile device and an indication of the data collection application to the vehicle;
subscribe to a characteristic exposing the element of vehicle data when the request is granted;
receive the vehicle data from the characteristic; and
provide an alert on a display of the mobile device when the vehicle data meets a threshold alert condition.

11. The system of claim 10, wherein the element of vehicle data is vehicle speed, and the threshold alert condition is a threshold speed.

12. The system of claim 10, wherein the mobile device is further configured to:
write the unique identifier of the mobile device and an indication of the element of vehicle data to a characteristic exposed by the vehicle; and
receive, from the vehicle, an indication of a characteristic providing the element of vehicle data.

13. The system of claim 12, wherein the characteristic providing the element of vehicle data is provided by one of: (i) a wireless transceiver connected to a vehicle electronic control unit (ECU); and (ii) a wireless transceiver of a computing platform of the vehicle to which the mobile device is paired.

14. A method comprising:
receiving a request from a mobile device executing a data collection application requiring vehicle speed data;
accessing a permission table to confirm that a unique identifier of the mobile device is authorized to access the vehicle speed data;
subscribing the mobile device to a characteristic providing the vehicle speed data; and
updating the element of vehicle speed data provided by the characteristic in accordance with a predefined threshold speed.

15. The method of claim 14, wherein the threshold includes one or more of: (i) a threshold update frequency, (ii) a data value above or below which updated vehicle data is advertised, and (iii) a threshold difference from a previous value of the vehicle data above or below which updated vehicle data is advertised.

16. The method of claim 14, wherein the vehicle data is exposed wirelessly from the computing platform over BLUETOOTH Low Energy (BLE).

* * * * *